United States Patent
Liu et al.

(10) Patent No.: US 9,824,206 B1
(45) Date of Patent: Nov. 21, 2017

(54) EYE GAZING PASSCODE GENERATION CROSSING AUGMENTED REALITY (AR) AND VIRTUAL REALITY (VR) DEVICES

(71) Applicant: International Business Machines Corporation, Armonk, NY (US)

(72) Inventors: Su Liu, Austin, TX (US); John D. Wilson, League City, TX (US); Yin Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/280,931

(22) Filed: Sep. 29, 2016

(51) Int. Cl.
| | |
|---|---|
| G06F 21/00 | (2013.01) |
| G06F 21/45 | (2013.01) |
| G06F 21/32 | (2013.01) |
| G06F 21/31 | (2013.01) |
| G06T 19/00 | (2011.01) |
| G06F 3/01 | (2006.01) |
| G02B 27/01 | (2006.01) |
| G02B 27/00 | (2006.01) |

(52) U.S. Cl.
CPC ......... *G06F 21/45* (2013.01); *G02B 27/0093* (2013.01); *G02B 27/0172* (2013.01); *G06F 3/013* (2013.01); *G06F 21/316* (2013.01); *G06F 21/32* (2013.01); *G06T 19/006* (2013.01); *G02B 2027/014* (2013.01); *G02B 2027/0138* (2013.01); *G06F 2221/2141* (2013.01)

(58) Field of Classification Search
CPC ... H04L 63/0861; H04L 63/08; H04L 63/083; G06F 21/32; G06F 3/04845; G06F 3/04842; G06F 21/31; G06F 21/6245; G06F 3/013

USPC .......... 726/4, 5, 6, 7, 19; 345/633; 382/115, 382/118; 713/158, 186
See application file for complete search history.

(56) References Cited

U.S. PATENT DOCUMENTS

| | | |
|---|---|---|
| 7,113,170 B2 | 9/2006 | Lauper et al. |
| 7,836,306 B2 | 11/2010 | Pyle et al. |
| (Continued) | | |

FOREIGN PATENT DOCUMENTS

| | | |
|---|---|---|
| CN | 100365641 C | 1/2008 |
| WO | 2015112433 A1 | 7/2015 |

OTHER PUBLICATIONS

English, "Modelling the Security of Recognition-Based Graphical Password Schemes," University of Glasgow, 2012, pp. 1-189.
Leblanc et al., "Guessing Click-Based Graphical Passwords by Eye Tracking," Eight Annual International Conference on Privacy, Security and Trust, 2010, pp. 197-204.
(Continued)

*Primary Examiner* — Alexander Lagor
(74) *Attorney, Agent, or Firm* — Zilka-Kotab, P.C.

(57) ABSTRACT

In one embodiment, a method includes initiating a password selection session on a source augmented reality or virtual reality device (hereafter the source AR/VR device). The method also includes tracking an eye gaze of a source user using the source AR/VR device. In addition, the method includes determining gazed content from the eye gaze of the source user using a password key phrase determination feature. Additionally, the method includes generating a symmetric password key utilizing the gazed content according to a set of password determination rules. Moreover, the method includes performing an operation using the source AR/VR device, the operation being secured by the symmetric password key. The symmetric password key is not exchanged with any other device.

17 Claims, 5 Drawing Sheets

(56) References Cited

U.S. PATENT DOCUMENTS

| | | |
|---|---|---|
| 9,003,196 B2 | 4/2015 | Hoyos et al. |
| 9,041,766 B1 | 5/2015 | Gates et al. |
| 9,117,066 B2 | 8/2015 | Nathan et al. |
| 2004/0061831 A1 | 4/2004 | Aughey et al. |
| 2004/0250141 A1* | 12/2004 | Casco-Arias ........... G06F 21/46 726/6 |
| 2008/0002262 A1 | 1/2008 | Chirieleison |
| 2008/0235759 A1 | 9/2008 | McCarty |
| 2013/0187773 A1* | 7/2013 | Tsou ....................... G06F 21/31 340/540 |
| 2014/0359284 A1 | 12/2014 | Pizano |
| 2015/0154598 A1 | 6/2015 | Forte et al. |
| 2016/0350971 A1* | 12/2016 | Athey ................... G06T 19/006 |

OTHER PUBLICATIONS

Kim et al., "Process Control Via Gaze Detection Technology," Intelligent Processing and Manufacturing of Materials, 1999. IPMM '99. Proceedings of the Second International Conference, pp. 1263-1269.
Sheela et al., "Gaze tracking based on run length coding," Multimedia Computing and Systems (ICMCS), International Conference IEEE, 2011, pp. 1-6.
Liu et al., U.S. Appl. No. 15/280,917, filed Sep. 29, 2016.
List of IBM Patents or Patent Applications Treated As Related.
Non-Final Office Action from U.S. Appl. No. 15/280,917, dated Mar. 6, 2017.
Liu et al., U.S. Appl. No. 15/694,630, filed Sep. 1, 2017.
Notice of Allowance from U.S. Appl. No. 15/280,917, dated Sep. 1, 2017.

\* cited by examiner

EYE GAZING PASSCODE GENERATION CROSSING AUGMENTED REALITY (AR) AND VIRTUAL REALITY (VR) DEVICES

BACKGROUND

The present invention relates to a collaborative security feature that uses gazed content of a user on augmented reality (AR) and virtual reality (VR) devices to generate a password.

When operating in AR and VR environments, there may be situations where it is important to protect data exchange, authenticate a user, or otherwise require a passcode to be generated without exposing that passcode in a message.

The use of AR and VR environments is more and more frequent as software and hardware that makes use of AR and VR environments are improved and become more prevalent. With the growth in data security breaches, and the increased amount of sensitive data being transferred in files, security is a critical concern for operating in these AR and VR environments.

In addition, a more compelling and convenient user experience for passcode creation and authentication in AR and VR environments would benefit the devices and software that are being developed for use in such environments.

SUMMARY

In one embodiment, a system includes a processing circuit and logic integrated with the processing circuit, executable by the processing circuit, or integrated with and executable by the processing circuit. The logic is configured to cause the processing circuit to initiate a password selection session on a source augmented reality or virtual reality device (hereafter the source AR/VR device). The logic is also configured to cause the processing circuit to track an eye gaze of a source user using the source AR/VR device. Also, the logic is configured to cause the processing circuit to determine gazed content from the eye gaze of the source user using a password key phrase determination feature. In addition, the logic is configured to cause the processing circuit to generate a symmetric password key utilizing the gazed content according to a set of password determination rules. Moreover, the logic is configured to cause the processing circuit to perform an operation using the source AR/VR device, the operation being secured by the symmetric password key. The symmetric password key is not exchanged with any other device.

In another embodiment, a computer program product includes a computer readable storage medium having program instructions embodied therewith. The embodied program instructions are executable by a processing circuit to cause the processing circuit to initiate, by the processing circuit, a password selection session on a source augmented reality or virtual reality device (hereafter the source AR/VR device). The embodied program instructions also cause the processing circuit to track, by the processing circuit, an eye gaze of a source user using the source AR/VR device. In addition, the embodied program instructions cause the processing circuit to determine, by the processing circuit, gazed content from the eye gaze of the source user using a password key phrase determination feature. The embodied program instructions also cause the processing circuit to generate, by the processing circuit, a symmetric password key utilizing the gazed content according to a set of password determination rules. Moreover, the embodied program instructions cause the processing circuit to perform, by the processing circuit, an operation using the source AR/VR device, the operation being secured by the symmetric password key. The symmetric password key is not exchanged with any other device.

In yet another embodiment, a method includes initiating a password selection session on a source augmented reality or virtual reality device (hereafter the source AR/VR device). The method also includes tracking an eye gaze of a source user using the source AR/VR device. In addition, the method includes determining gazed content from the eye gaze of the source user using a password key phrase determination feature. Additionally, the method includes generating a symmetric password key utilizing the gazed content according to a set of password determination rules. Moreover, the method includes performing an operation using the source AR/VR device, the operation being secured by the symmetric password key. The symmetric password key is not exchanged with any other device.

Other aspects and embodiments of the present invention will become apparent from the following detailed description, which, when taken in conjunction with the drawings, illustrate by way of example the principles of the invention.

DETAILED DESCRIPTION

Figure 1:
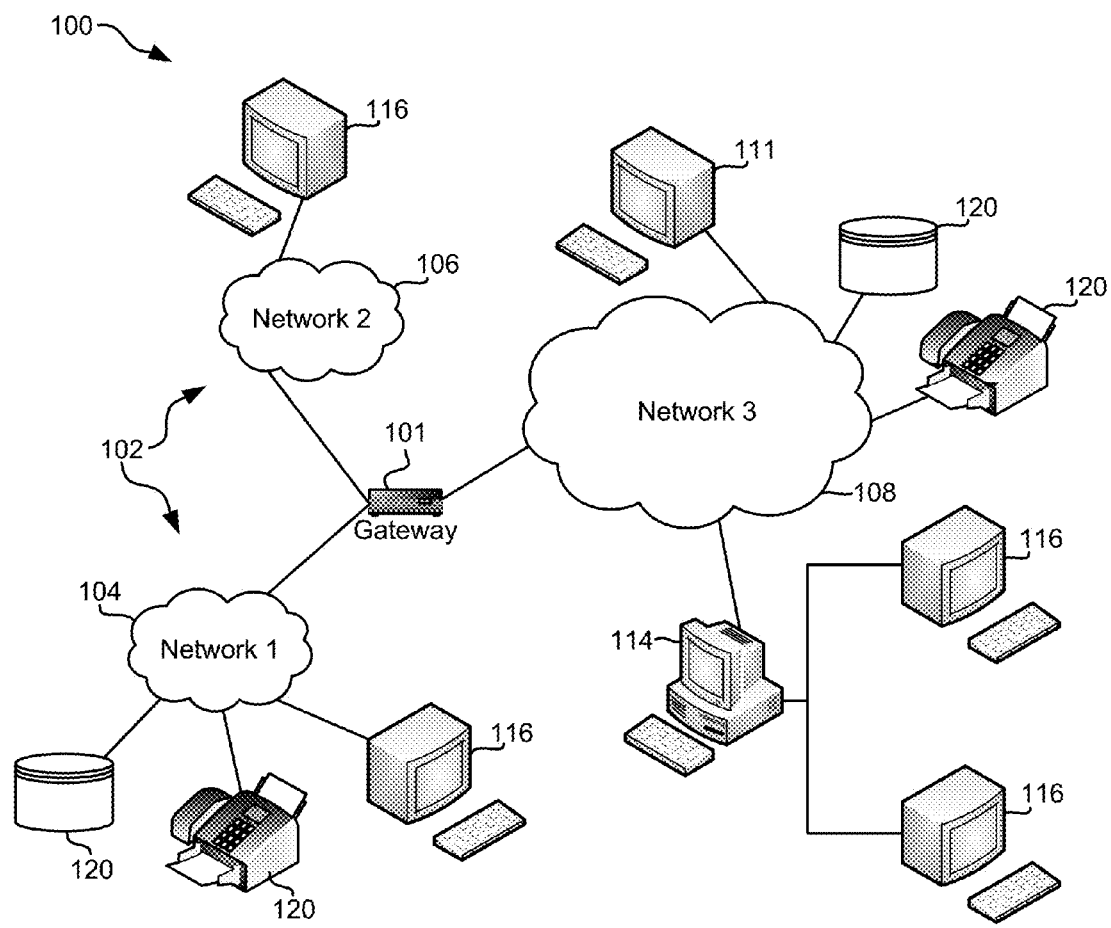
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for passcode generation in augmented reality (AR) and virtual reality (VR) environments.

In one general embodiment, a system includes a processing circuit and logic integrated with the processing circuit, executable by the processing circuit, or integrated with and executable by the processing circuit. The logic is configured to cause the processing circuit to initiate a password selection session on a source augmented reality or virtual reality device (hereafter the source AR/VR device). The logic is also configured to cause the processing circuit to track an eye gaze of a source user using the source AR/VR device. Also, the logic is configured to cause the processing circuit to determine gazed content from the eye gaze of the source user using a password key phrase determination feature. In addition, the logic is configured to cause the processing circuit to generate a symmetric password key utilizing the gazed content according to a set of password determination rules. Moreover, the logic is configured to cause the processing circuit to perform an operation using the source AR/VR device, the operation being secured by the symmetric password key. The symmetric password key is not exchanged with any other device.

In another general embodiment, a computer program product includes a computer readable storage medium having program instructions embodied therewith. The embodied program instructions are executable by a processing circuit to cause the processing circuit to initiate, by the processing circuit, a password selection session on a source augmented reality or virtual reality device (hereafter the source AR/VR device). The embodied program instructions also cause the processing circuit to track, by the processing circuit, an eye gaze of a source user using the source AR/VR device. In addition, the embodied program instructions cause the processing circuit to determine, by the processing circuit, gazed content from the eye gaze of the source user using a password key phrase determination feature. The embodied program instructions also cause the processing circuit to generate, by the processing circuit, a symmetric password key utilizing the gazed content according to a set of password determination rules. Moreover, the embodied program instructions cause the processing circuit to perform, by the processing circuit, an operation using the source AR/VR device, the operation being secured by the symmetric password key. The symmetric password key is not exchanged with any other device.

In yet another general embodiment, a method includes initiating a password selection session on a source augmented reality or virtual reality device (hereafter the source AR/VR device). The method also includes tracking an eye gaze of a source user using the source AR/VR device. In addition, the method includes determining gazed content from the eye gaze of the source user using a password key phrase determination feature. Additionally, the method includes generating a symmetric password key utilizing the gazed content according to a set of password determination rules. Moreover, the method includes performing an operation using the source AR/VR device, the operation being secured by the symmetric password key. The symmetric password key is not exchanged with any other device.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, handheld computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
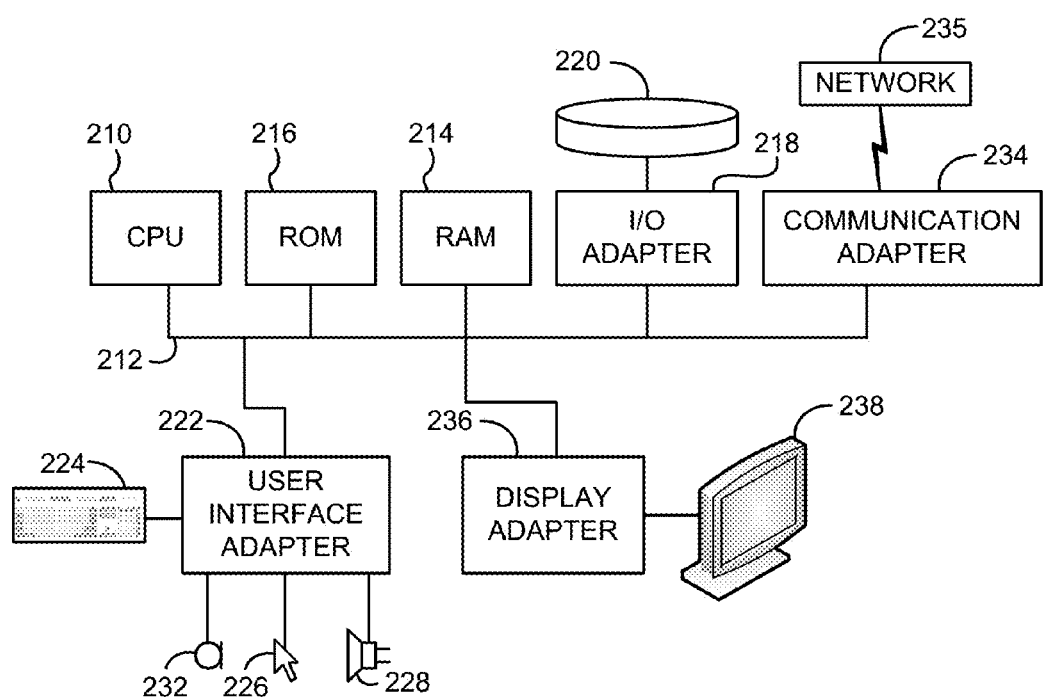
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235

(e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

There are typically two types of encryption that are used to mask the actual data and passwords used for securing information: symmetric encryption and asymmetric encryption.

Symmetric encryption is also referred to as secret key encryption, which uses a secret key to encrypt and decrypt data. But the problem with this encryption technique is that exchanging the secret key over the internet may result in the secret key being intercepted by an unauthorized entity. This unauthorized entity is now able to decrypt all of the data that is transferred over the connection. In this way, the security of data that is protected with symmetric encryption is reduced or eliminated.

Asymmetric encryption uses a key pair to encrypt and decrypt data: a public key and a private key. Because the public key is intended to be public, there is no need to worry about exposing the public key to others. However, this technique of encryption is more time consuming to encrypt and decrypt data since asymmetric keys are typically quite lengthy to make it more difficult to duplicate the asymmetric key through a brute force attack. Therefore, this technique is not suitable to encrypt large amounts of data, which is becoming more and more prevalent as the complexity and size of computer systems grows.

In order to provide data encryption in AR/VR environments, a new "password-less" data encryption integrated with cooperative password technology is described in various embodiments below that may be used with AR/VR devices and/or consoles.

In one embodiment, to provide symmetric password-protected data encryption without transferring the password, a set of real time password selection rules (these rules dictate where, when, and what to generate for use as a one-time use password) and password key phrase determination rules (how to generate the one-time passwords) are created. These rules may be one-time use, or may be used for more than one password generation over a period of time, a certain number of uses, etc.

In another embodiment, some or all related entities and information are determined to prepare to encrypt the data (e.g., the file/object/data to be encrypted, the folder/location in which to encrypt the data, authentication information, connection information, user information, etc.) prior to actually encrypting the data.

Many functions and operations may be secured using the collaborative security features described herein, such as providing access rights to users, providing security access to secure locations (physical or virtual), licensing of software for use by a user, etc.

In yet another embodiment, a password selection session is invoked and the password key phrase determination feature is activated. This password selection session is used to track a first user's eye gaze and determine what content is being viewed in the corresponding AR/VR environment, using the first user's device during the password selection session. Moreover, the password selection session is used to track a second user's eye gaze to determine what content is being viewed in the corresponding AR/VR environment on the second user's device.

Using gazing-detection technology to generate the symmetric key may also improve the security of the data encryption as well as enhance the user experience by replacing the tedious task of manual password entry and/or selection with a unique password selection activity using the immersive AR/VR environment being viewed and interacted with by the user. Moreover, this technique leverages existing augmented reality tools, such as eyeball gaze tracking and detection.

The eye gazing of user(s) is tracked and detected using an AR/VR device located locally to the user, such as a head-mounted device having a camera for tracking eye movement and gaze of the user, portable electronic device having a camera for tracking eye movement and gaze of the user, a wearable device having a camera for tracking eye movement and gaze of the user, etc., such as GOOGLE GLASS, OCULUS RIFT, GOOGLE CARDBOARD, CASTAR, META, SAMSUNG GEAR VR, SONY PLAYSTATION VR, HTC VIVE, EHANG VR GOGGLES, action sports cameras such as GO PRO products with associated mounting equipment, smartphone eye tracking software available from APPLE, SAMSUNG, etc. The eye gaze of the user who initiates the data encryption (the source user) is detected by each AR/VR devices used by all participants involved in the secured operation (including at least the source AR/VR device and the receiver AR/VR device). The secured operation may be a data transfer, a user authentication session, providing access rights to one or more users, providing security access to secure locations (physical or virtual as a gatekeeper function), licensing of software for use by a user, or any other function or operation that is improved by the use of a secure passcode.

Moreover, the gazed content, location, object, etc., is identified according to the eye gaze of the source user, and is used to create a symmetric password key according to the password determination rules. The activation condition for gaze detection may include, according to various embodiments, a length of time in which content is gazed at by the source user, voice-activation by the source user indicating that the gazed content is currently being gazed at for password key generation, simulated or actual touch by the source user, gesture activation by the source user where the source user gestures in a manner predetermined to indicate selection of content for password key generation, action by the source user that indicates selection of content for password key generation, etc.

In another embodiment, a password key is generated according to the password key phrase determination rules on all sides of an exchange of data (e.g., on however many AR/VR devices are involved in the data encryption). The symmetric password key is separately generated on all AR/VR devices involved in the data encryption based on the same set of password key determination rules. Therefore, there is no need to exchange the password key, e.g., over the internet, wirelessly, etc. Accordingly, the risk of disclosing the symmetric key to unauthorized entities is reduced.

The password determination rules may include, but are not limited to, any of the following scenarios. Aspects may be extracted from the gazed content as usable data, such as text, a pattern, a color, one or more people, one or more living things such as plants, animals, etc., one or more objects, and one or more attributes of the gazed content (e.g., age, height, weight, hair color, eye color, movement, gesture, expression, status, object type, quantity of objects or people, position of the gazed content, dimensions, appearance, color, materials of construction, state of motion, etc.). Thereafter, this usable data (aspects of the gazed content) may be digitized and assembled into a symmetric key according to one or more priority rules, compression rules, hashing algorithms, etc., such that the symmetric key has a predetermined length, is produced in a predetermined order, and is reproducible on any of the AR/VR devices used in the data encryption. The length and order may be agreed upon by all devices in the data encryption in one embodiment. The variables that will be included in the password key are agreed upon by all users in the data encryption and may be determined at a start of the password key generation process.

The symmetric password key may be a random set of characters, a numeric string, or an alphanumeric string of a predetermined length in one embodiment. In another embodiment, an algorithm may be applied to the usable data of the gazed content to determine which aspects to select for the password key and in which order to place the aspects to form the symmetric password key.

In addition, performance for symmetric key decryption is faster than asymmetric key decryption, typically because symmetric cryptography does not increase a size of a cryptogram used in the process as opposed to asymmetric cryptography.

Moreover, the generated symmetric password key may be used as a one-time password to secure the data encryption. The one-time password allows for the advantages of a one-time-one cipher to be utilized, which may also prevent password detection/interception and transmission leakage which may occur as encrypted data is transferred multiple times using the same password key.

In another approach, the generated symmetric password key may be usable for a predetermined and limited amount of time before it expires, such as 1 second, 10 seconds, 1 minute, 1 hour, 1 day, 1 week, etc. After expiration of the generated symmetric password key, a new password selection session is invoked to obtain a new symmetric password key to continue with data encryption.

In yet another approach, the generated symmetric password key may be usable for a predetermined and limited amount of data transfer before it expires, such as 10 kb, 100 kb, 1 MB, 100 MB, 1 GB, 100 GB, 1 TB, etc. After expiration of the generated symmetric password key, a new password selection session is invoked to obtain a new symmetric password key to continue with data encryption.

According to another embodiment, the selected password key is used to encrypt the source data (file or object). The encrypted data may include files, directories, resources available to the first user, documents, access rights, etc. According to other embodiments, the selected password key may be used for access to secure areas (both actual physical locations such as securing a door to one or more rooms, securing an access point to one or more buildings, securing an entry to a site, licensing a software product, providing access rights to a user to access secure content, or some other function that utilizes security and requires passcode generation.

The selection of the password key may be transparent to one or more of the users of the AR/VR device(s) in one embodiment. In an alternate embodiment, the source user may be aware of the selection process while the receiver user is unaware of the process, and simply receives the requested or provided password-protected data.

Thereafter, in one embodiment, the encrypted source data (file or object) is transferred from the source AR/VR device (or some storage location accessible to the source AR/VR device) to at least the receiver AR/VR device (or some storage location accessible to the receiver AR/VR device and to however many other devices that are authorized to receive the data).

After the transfer, in accordance with one embodiment, the transferred data is decrypted using the same password key on the receiver AR/VR device which is generated according to the same set of password key generation rules established earlier.

Figure 3:
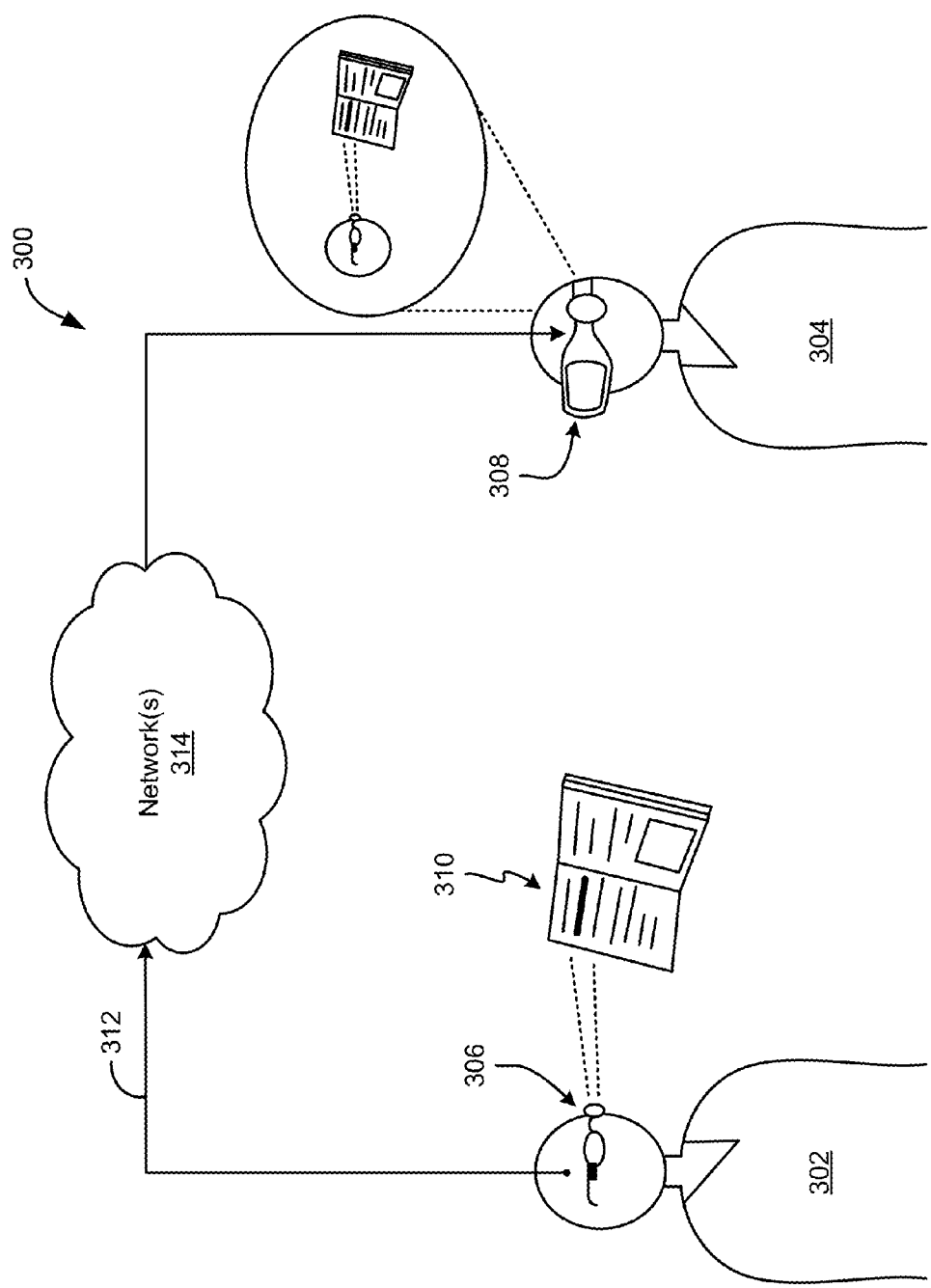
FIG. 3 illustrates a secure data exchange in a collaborative augmented reality/virtual reality (AR/VR) environment, in accordance with one embodiment.

FIG. 3 shows a secure data exchange in a collaborative AR/VR environment 300, in accordance with one embodiment. As shown, two users, a source user 302 and a receiver user 304, may be utilizing a source AR/VR device 306 and a receiver AR/VR device 308, respectively. AR/VR device 306 is shown as augmented reality glasses, such as GOOGLE GLASS, that are being worn by the source user 302, but may be any known AR device, VR device, or computing device capable of tracking eyeball movement of the source user 302. AR/VR device 308 is a virtual reality headset, such as OCULUS RIFT, but may be any known AR or VR device.

The source user 302 gazes at text 310 in a book in a way that triggers initiation of the password selection session. This initiation may be triggered by any initiation criteria, such as a length of time in which the source user 302 gazes at the text 310 exceeding a threshold, words or sounds spoken by the source user 302 that have been configured to cause initiation of the password selection session, a gesture or movement by the source user 302 configured to cause initiation of the password selection session, etc. During the password selection, a password key phrase determination feature is activated which searches for and locates the gaze content (in this case the text 310 in the book) to be used for password key generation.

Meanwhile, the AR/VR device 308 of the receiver user 304 determines the source user's eye gaze in order to track the same text 310 via a link 312 or channel of communication (which may utilize one or more networks 314) between the AR/VR device 306 of the source user 302 and the AR/VR device 308 of the receiver user 304. Both devices have the same set of password key determination rules, and with these same password key determination rules, a symmetric key is generated on both of the AR/VR device 306 and the AR/VR device 308 based on the gazed text 310.

After generation of the symmetric key on both devices, data to be sent from the AR/VR device 306 (or some other storage location accessible) of the source user 302 to the AR/VR device 308 (or some other storage location accessible) of the receiver user 304 is encrypted on the source user side with the symmetric password key and this encrypted data is sent to the receiver user 304 via the link 312. After the receiver user 304 receives the encrypted data, the symmetric key may then be used to decrypt the data.

In other examples of gazed content that may be used for password generation, the source user 302 may gaze at a moving red car, and this gazed content is transmitted to the AR/VR device 308 of the receiver user 304 and indicates that the moving red car will be used for password key generation, in which case the symmetric password key may be "a moving red car" or some other description of the gazed content according to the password key determination rules. Moreover, the source user 302 may gaze at a green street sign that reads "Broadway," and this gazed content is transmitted to the AR/VR device 308 of the receiver user 304 and indicates that the Broadway street sign will be used for password key generation, in which case the symmetric password key may be "green Broadway" or some other description of the gazed content according to the password key determination rules.

Any portion, aspect, characteristic, and feature of the gazed content and environment around the gazed content may be utilized to form the symmetric password key, according to the predetermined set of password key determination rules.

Figure 4:
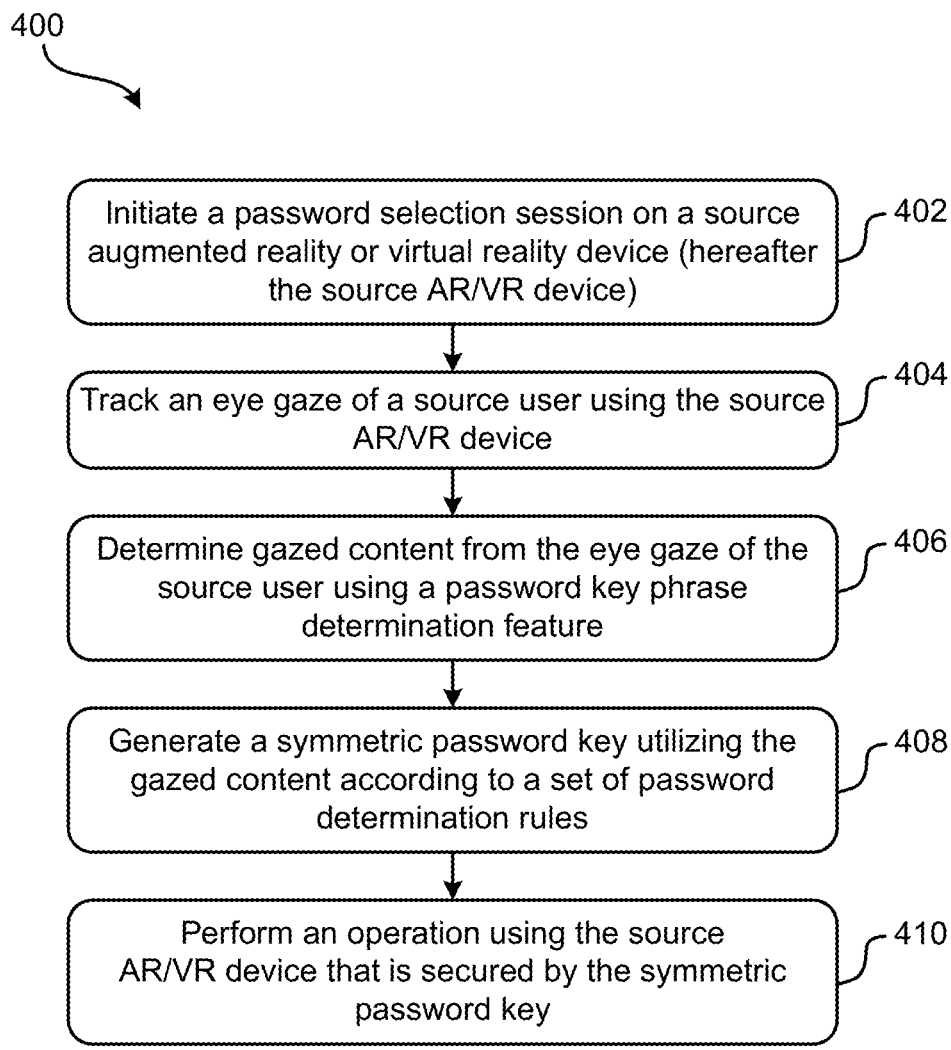
FIG. 4 shows a flowchart of a method, according to one embodiment.

Now referring to FIG. 4, a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a cloud server, a portable computer, a handheld or wearable computer, an AR device, a VR device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 400. Illustrative processors include, but are not limited to, a CPU, an ASIC, a FPGA, etc., combinations thereof, or any other suitable computing device known in the art.

As shown in FIG. 4, method 400 may start with operation 402, where a password selection session is initiated on a source AR/VR device by a source user. The source user may be any person or entity which is utilizing the source AR/VR device, and is authorized to access information, communicate with other devices, provide feedback, create secure passcodes to encrypt data, etc., using the source AR/VR device.

Any AR/VR device known in the art may be utilized to generate the password key without sending the password key to another device, including but not limited to, augmented reality glasses and/or headsets, virtual reality goggles and/or headsets, immersive full body motion-capture devices, resistive and positive feedback immersive VR devices, etc.

The password selection session may cause the source AR/VR device to determine and capture gazed content from the source user using eyeball tracking technology.

In operation 404, an eye gaze by the source user is tracked using the source AR/VR device. Any available technology may be used to track the eye gaze of the source user, such as eyeball tracking software included in a smartphone, a set of AR glasses, a set of VR goggles, a camera fixed to the eyes of the source user, a set of contact lenses configured for tracking eye movement and focus, etc.

Moreover, in a further embodiment, the eye gaze of the source user may also be tracked by at least a receiver AR/VR device that is in communication with the source AR/VR device.

In operation 406, gazed content is determined from the eye gaze of the source user. In order to determine the gazed content, one or more password key phrase determination features may be used. These password key phrase determination features may dictate which types of gazed content may be used for password generation, along with how the source user must gaze at the content, for how long of a period of time, and which actions or gestures may be used to indicate the gazed content is to be used for password key generation.

In operation 408, a symmetric password key is generated utilizing the gazed content according to a set of password determination rules. The set of password determination rules may dictate where, when, and what to generate for use as a password key for encryption of data.

In operation 410, an operation is performed using the source AR/VR device. The operation is secured by the symmetric password key. Any secure operation may be performed, such as data transfer, access rights determination, licensing, user authentication, etc. Moreover, any encryption technique may be used to encrypt data with the symmetric password key with the proviso that the data may be decrypted with the same symmetric password key.

In one embodiment, method 400 may include sharing and/or transmitting the eye gaze of the source user with a receiver AR/VR device that is in communication with the source AR/VR device, such that the receiver AR/VR device has information needed to create the symmetric password key. In this way, the receiver AR/VR device has foundational information to determine the symmetric password key from the gazed content in accordance with the received set of password determination rules. Moreover, an unauthorized entity will not be able to discern how the set of password determination rules are to be applied to the gazed content because they will not be able to view the gazed content as does the receiver AR/VR device.

In method 400, the symmetric password key is not exchanged with any other device; however, each device in the data exchange is configured to generate the same symmetric password key according to the set of password determination rules and the shared gazed content of the source user.

In one embodiment, method 400 may include determining the set of password determination rules using the source AR/VR device, the receiver AR/VR device, or cooperatively with both devices. The set of password determination rules dictate how the symmetric password key is determined from the gazed content, such as what aspects of the gazed content to utilize (e.g., person, place, object, activity, etc.), which characteristics of the gazed content are used (e.g., color, size, shape, location, position, etc.), and any other factors that are used to determine the symmetric password key from the gazed content that is reproducible on any other device receiving the same gazed content.

Moreover, method 400 may include transmitting the set of password determination rules to the receiver AR/VR device prior to performing the secure operation using the source AR/VR device.

According to one approach, the password selection session may be initiated in response to a triggering action performed by the source user on the source AR/VR device. This triggering action may be any discernible action performed by the source user, such a length of time in which content is gazed at by the source user being greater than a threshold, voice-activation by the source user (e.g., speaking a command may indicate the source user's gaze is on the gazed content), simulated or actual touching of an object by the source user (e.g., holding onto an object while gazing at it for a predetermined amount of time may indicate the gazed content), gesturing in a predetermined manner by the source user (e.g., pointing at an object with both hands may indicate that gazed content), blinking in a predetermined manner by the source user (e.g., two quick blinks followed by a long blink may be a pattern that indicates the gazed content), starting a data transfer, attempting to access a user-restricted area (either physical or virtual), attempting to run a rights-restricted application on the source AR/VR device, etc.

In another embodiment, the set of password determination rules may utilize at least one aspect of the gazed content to generate the symmetric password key. The at least one aspect may include any of the following: text displayed on a surface (such as in a book, newspaper, billboard, etc.), a pattern on a surface (checks, hounds tooth, stripes, squares, dots, etc.), a pattern of movement (swinging a head back and forth, tapping feet to a rhythm, etc.), a color, a person, a living thing, an object, along with one or more attributes of the gazed content.

The set of password determination rules may also dictate an order and length for the symmetric password key. In this approach, determining the symmetric password key further includes digitizing the at least one aspect of the gazed content to form digitized content and assembling the digitized content into the symmetric password key. The symmetric password key may have a predetermined length and may be assembled in a predetermined order according to the set of password determination rules.

Method 400 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 400.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 400.

Figure 5:
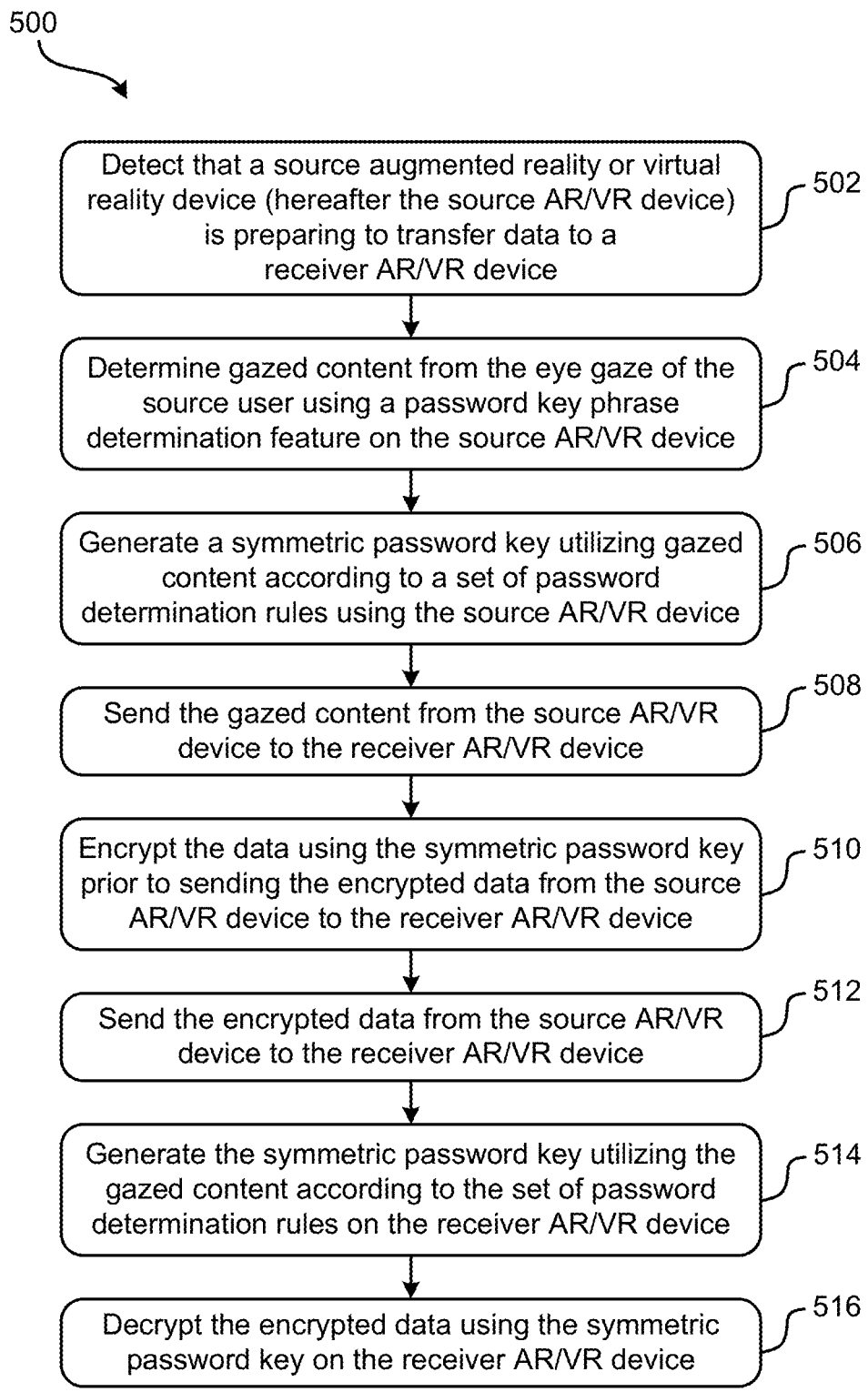
FIG. 5 shows a flowchart of another method, according to one embodiment.

Now referring to FIG. 5, a method 500 is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a cloud server, a portable computer, a handheld or wearable computer, an AR device, a VR device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a CPU, an ASIC, a FPGA, etc., combinations thereof, or any other suitable computing device known in the art.

As shown in FIG. 5, method 500 may start with operation 502, where preparation to transfer data to a receiver AR/VR device is detected on a source AR/VR device. These preparations may include, but are not limited to, collecting the data to be transferred in a buffer, tagging data to be transferred, opening a data socket on the source AR/VR device to perform a transfer, communicating with the target AR/VR device or some intermediary router, switch, network, etc.

Any AR/VR device known in the art may be utilized in the secure data transfer, including but not limited to, augmented reality glasses and/or headsets, virtual reality goggles and/or headsets, immersive full body motion-capture devices, resistive and positive feedback immersive VR devices, etc.

In operation 504, gazed content is determined from the eye gaze of the source user of the source AR/VR device. In order to determine the gazed content, one or more password key phrase determination features may be used. These password key phrase determination features may dictate which types of gazed content may be used for password generation, along with how the source user must gaze at the content, for how long of a period of time, and which actions or gestures may be used to indicate the gazed content is to be used for password key generation.

In one embodiment, the gazed content may be determined from tracking an eye gaze of the source user using the source AR/VR device. Any available technology may be used to track the eye gaze of the source user, such as eyeball tracking software included in a smartphone, a set of AR glasses, a set of VR goggles, a camera fixed to the eyes of the source user, a set of contact lenses configured for tracking eye movement and focus, etc.

Moreover, in a further embodiment, the eye gaze of the source user may also be tracked by at least a receiver AR/VR device that is in communication with the source AR/VR device. In another embodiment, to be able to track the eye gaze of the source user on the receiver AR/VR device, the eye gaze may be transmitted to the receiver AR/VR device in a separate communication from any sharing of password key phrase determination features, a set of password determination rules, identity of the source user, etc.

In operation 506, a symmetric password key is generated by the source AR/VR device utilizing the gazed content according to a set of password determination rules. The set of password determination rules may dictate where, when, and what to use to generate the password key for encryption of data, or some other secure operation.

In operation 508, the gazed content and/or the eye gaze of the source user is sent from the source AR/VR device to the receiver AR/VR device via any available connection between the two devices, such as a server-host arrangement, via a central or shared server, via a cloud system, etc. This gazed content may be used to generate the symmetric password key on the receiver AR/VR device In operation 510, the data is encrypted by the source AR/VR device using the symmetric password key prior to sending encrypted data to the receiver AR/VR device. Any known encryption technique may be used to encrypt the data with the symmetric password key as long as the data is able to be decrypted with the symmetric password key generated by the source AR/VR device.

In operation 512, the encrypted data is sent from the source AR/VR device to the receiver AR/VR device. The encrypted data may be divided into several portions, packaged, encapsulated in one or more headers, or manipulated in any other way that is known in the art and appropriate to protect the encrypted data to arrive securely at the receiver AR/VR device prior to transmission.

In operation 514, the symmetric password key is generated by the receiver AR/VR device utilizing the gazed content (sent thereto previously or after receiving the encrypted data) according to a set of password determination rules (also sent thereto previously or after receiving the encrypted data). Because the set of password determination rules dictate where, when, and what to use to generate the password key for encryption of data, the receiver AR/VR device is able to produce the exact same symmetric password key that was generated by the source AR/VR device prior to sending the encrypted data based on the gazed content.

In operation 516, the encrypted data is decrypted using the symmetric password generated by the receiver AR/VR device. Typically, an opposite process is used to decrypt the encrypted data as was used by the source AR/VR device to encrypt the data originally.

In method 500, the symmetric password is not exchanged by the source AR/VR device with any other device; however, each device in the data exchange is configured to generate the same symmetric password key according to the set of password determination rules and the shared gazed content of the source user.

In one embodiment, method 500 may include determining the set of password determination rules using the source AR/VR device. The set of password determination rules dictate how the symmetric password key is determined from the gazed content, such as what aspects of the gazed content to utilize (e.g., person, place, object, activity, etc.), which characteristics of the gazed content are used (e.g., color, size, shape, location, position, etc.), and any other factors that are used to determine the symmetric password key from the gazed content that is reproducible on any other device receiving the same gazed content.

Moreover, method 500 may include transmitting the set of password determination rules to the receiver AR/VR device prior to sending the encrypted data to the receiver AR/VR device. In another embodiment, method 500 may include transmitting the eye gaze of the source user to at least the receiver AR/VR device that is in communication with the source AR/VR device. In this way, the receiver AR/VR device has foundational information to determine the symmetric password key from the gazed content in accordance with the received set of password determination rules. Moreover, an unauthorized entity will not be able to discern how the set of password determination rules are to be applied to the gazed content because they will not be able to view the gazed content as does the receiver AR/VR device.

According to one approach, the password selection session may be initiated in response to a triggering action performed by the source user on the source AR/VR device. This triggering action may be any discernible action performed by the source user, such a length of time in which content is gazed at by the source user being greater than a threshold, voice-activation by the source user (e.g., speaking a command may indicate the source user's gaze is on the gazed content), simulated or actual touching of an object by the source user (e.g., holding onto an object while gazing at it for a predetermined amount of time may indicate the gazed content), gesturing in a predetermined manner by the source user (e.g., pointing at an object with both hands may indicate that gazed content), blinking in a predetermined manner by the source user (e.g., two quick blinks followed by a long blink may be a pattern that indicates the gazed content), etc.

In another embodiment, the set of password determination rules may utilize at least one aspect of the gazed content to generate the symmetric password key. The at least one aspect may include any of the following: text displayed on a surface (such as in a book, newspaper, billboard, etc.), a pattern on a surface (checks, hounds tooth, stripes, squares, dots, etc.), a pattern of movement (swinging a head back and forth, tapping feet to a rhythm, etc.), a color, a person, a living thing, an object, along with one or more attributes of the gazed content.

The set of password determination rules may also dictate an order and length for the symmetric password key. In this approach, determining the symmetric password key further includes digitizing the at least one aspect of the gazed content to form digitized content and assembling the digitized content into the symmetric password key. The symmetric password key may have a predetermined length and may be assembled in a predetermined order according to the set of password determination rules.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising: a processing circuit; and
logic integrated with the processing circuit, executable by the processing circuit, or integrated with and executable by the processing circuit, the logic being configured to cause the processing circuit to:
initiate a password selection session on a source augmented reality or virtual reality device (hereafter the source AR/VR device);
track an eye gaze of a source user using the source AR/VR device; determine gazed content from the eye gaze of the source user using a password key phrase determination feature;
generate a symmetric password key utilizing the gazed content according to a set of password determination rules;
transmit the eye gaze of the source user to a receiver AR/VR device; and
perform an operation using the source AR/VR device, the operation being secured by the symmetric password key, wherein the eye gaze of the source user is transmitted to the receiver AR/VR device in a transmission separate from a transmission used to transmit the set of password determination rules,
wherein the symmetric password key is not exchanged with any other device.

2. The system as recited in claim 1, wherein the logic is further configured to cause the processing circuit to:
determine the set of password determination rules using the source AR/VR device, the set of password determination rules dictating how the symmetric password key is determined from the gazed content; and
transmit the set of password determination rules to the receiver AR/VR device, wherein the receiver AR/VR device is configured to verify the symmetric password key.

3. The system as recited in claim 1, wherein the password selection session is initiated in response to a triggering action performed by the source user on the source AR/VR device, and wherein the triggering action is selected from a group comprising: a length of time in which content is gazed at by the source user being greater than a threshold, voice-activation by the source user, simulated or actual touching of an object by the source user, gesturing in a predetermined manner by the source user, blinking in a predetermined manner by the source user.

4. The system as recited in claim 1, wherein the set of password determination rules utilizes at least one aspect of the gazed content to generate the symmetric password key, the at least one aspect being selected from a group comprising: text, a pattern, a color, a person, a living thing, an object, and one or more attributes of the gazed content, and wherein the logic configured to cause the processing circuit to determine the symmetric password key further causes the processing circuit to:
digitize the at least one aspect of the gazed content to form digitized content; and
assemble the digitized content into the symmetric password key that has a predetermined length and is assembled in a predetermined order.

5. The system as recited in claim 1, wherein the operation secured by the symmetric password key is selected from a group comprising: a data transfer, determination of access rights for the source user, licensing of an application configured to operate on the source AR/VR device, and authentication of an identity of the source user.

6. The system as recited in claim 1, wherein the password determination rules dictate:
a predetermined length for the symmetric password key;
a predetermined order for assembly of the symmetric password key from usable data of the gazed content; and
variables that are available to use in the symmetric password key, and
wherein the logic configured to cause the processing circuit to determine the symmetric password key further causes the processing circuit to:
extract usable data from the gazed content;
digitize the usable data to form digitized content; and
assemble the digitized content into the symmetric password key that has the predetermined length, is assembled in the predetermined order, and is reproducible on the receiver AR/VR device in accordance with the set of password determination rules.

7. The system as recited in claim 6, wherein the predetermined length, the predetermined order, and the variables that are available to use in the symmetric password key are agreed upon by communication between the source AR/VR device and the receiver AR/VR device in response to initiation of the password selection session.

8. A computer program product, the computer program product comprising a computer readable storage medium having program instructions embodied therewith, the embodied program instructions being executable by a processing circuit to cause the processing circuit to:
initiate, by the processing circuit, a password selection session on a source augmented reality or virtual reality device (hereafter the source AR/VR device);
track, by the processing circuit, an eye gaze of a source user using the source AR/VR device;
determine, by the processing circuit, gazed content from the eye gaze of the source user using a password key phrase determination feature;
generate, by the processing circuit, a symmetric password key utilizing the gazed content according to a set of password determination rules;
transmit, by the processing circuit, the eye gaze of the source user to a receiver AR/VR device, wherein the eye gaze of the source user is transmitted to the receiver AR/VR device in a transmission separate from a transmission used to transmit the set of password determination rules; and
perform, by the processing circuit, an operation using the source AR/VR device, the operation being secured by the symmetric password key,
wherein the symmetric password key is not exchanged with any other device.

9. The computer program product as recited in claim 8, wherein the embodied program instructions are further executable by the processing circuit to cause the processing circuit to:
determine, by the processing circuit, the set of password determination rules using the source AR/VR device, the set of password determination rules dictating how the symmetric password key is determined from the gazed content; and
transmit, by the processing circuit, the set of password determination rules to a receiver AR/VR device, wherein the receiver AR/VR device is configured to verify the symmetric password key.

10. The computer program product as recited in claim 9, wherein the password selection session is initiated in response to a triggering action performed by the source user on the source AR/VR device, and wherein the triggering action is selected from a group comprising: a length of time in which content is gazed at by the source user being greater than a threshold, voice-activation by the source user, simulated or actual touching of an object by the source user, gesturing in a predetermined manner by the source user, blinking in a predetermined manner by the source user.

11. The computer program product as recited in claim 9, wherein the set of password determination rules utilizes at least one aspect of the gazed content to generate the symmetric password key, the at least one aspect being selected from a group comprising: text, a pattern, a color, a person, a living thing, an object, and one or more attributes of the gazed content, and wherein the embodied program instructions are further executable by the processing circuit to cause the processing circuit to:
  digitize, by the processing circuit, the at least one aspect of the gazed content to form digitized content; and
  assemble, by the processing circuit, the digitized content into the symmetric password key that has a predetermined length and is assembled in a predetermined order.

12. The computer program product as recited in claim 9, wherein the operation secured by the symmetric password key is selected from a group comprising: a data transfer, determination of access rights for the source user, licensing of an application configured to operate on the source AR/VR device, and authentication of an identity of the source user.

13. A method, comprising:
  initiating a password selection session on a source augmented reality or virtual reality device (hereafter the source AR/VR device);
  tracking an eye gaze of a source user using the source AR/VR device;
  determining gazed content from the eye gaze of the source user using a password key phrase determination feature;
  generating a symmetric password key utilizing the gazed content according to a set of password determination rules;
  transmitting the eye gaze of the source user to a receiver AR/VR device; and
performing an operation using the source AR/VR device, the operation being secured by the symmetric password key, wherein the eye gaze of the source user is transmitted to the receiver AR/VR device in a transmission separate from a transmission used to transmit the set of password determination rules,
  wherein the symmetric password key is not exchanged with any other device.

14. The method as recited in claim 13, further comprising:
  determining the set of password determination rules using the source AR/VR device, the set of password determination rules dictating how the symmetric password key is determined from the gazed content; and
  transmitting the set of password determination rules to a receiver AR/VR device, wherein the receiver AR/VR device is configured to verify the symmetric password key.

15. The method as recited in claim 13, wherein the password selection session is initiated in response to a triggering action performed by the source user on the source AR/VR device, and wherein the triggering action is selected from a group comprising: a length of time in which content is gazed at by the source user being greater than a threshold, voice-activation by the source user, simulated or actual touching of an object by the source user, gesturing in a predetermined manner by the source user, blinking in a predetermined manner by the source user.

16. The method as recited in claim 13, wherein the set of password determination rules utilizes at least one aspect of the gazed content to generate the symmetric password key, the at least one aspect being selected from a group comprising: text, a pattern, a color, a person, a living thing, an object, and one or more attributes of the gazed content, and wherein the method further comprises:
  digitizing the at least one aspect of the gazed content to form digitized content; and
  assembling the digitized content into the symmetric password key that has a predetermined length and is assembled in a predetermined order.

17. The method as recited in claim 13, wherein the operation secured by the symmetric password key is selected from a group comprising: a data transfer, determination of access rights for the source user, licensing of an application configured to operate on the source AR/VR device, and authentication of an identity of the source user.

* * * * *